US011161300B2

(12) United States Patent
Budge et al.

(10) Patent No.: US 11,161,300 B2
(45) Date of Patent: Nov. 2, 2021

(54) SYSTEM AND PRINT HEAD FOR ADDITIVE MANUFACTURING SYSTEM

(71) Applicant: CC3D LLC, Coeur d'Alene, ID (US)

(72) Inventors: Trevor David Budge, Coeur d'Alene, ID (US); Ryan C. Stockett, Spokane, WA (US); Tyler B. Alvarado, Coeur d'Alene, ID (US); Kenneth Lyle Tyler, Coeur d'Alene, ID (US); Colin Hugh Hambling, Medina, WA (US); Brian Dunham, Sagle, ID (US); Nathan Andrew Stranberg, Post Falls, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 258 days.

(21) Appl. No.: 16/368,776

(22) Filed: Mar. 28, 2019

(65) Prior Publication Data
US 2019/0315057 A1 Oct. 17, 2019

Related U.S. Application Data

(60) Provisional application No. 62/656,155, filed on Apr. 11, 2018.

(51) Int. Cl.
*B29C 64/20* (2017.01)
*B29C 64/209* (2017.01)
(Continued)

(52) U.S. Cl.
CPC .......... *B29C 64/209* (2017.08); *B29C 64/165* (2017.08); *B29C 64/291* (2017.08);
(Continued)

(58) Field of Classification Search
CPC .... B29C 64/209; B29C 64/291; B29C 64/165
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

CN 106313496 A 1/2017
CN 107379539 A 11/2017
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Joseph S Del Sole
*Assistant Examiner* — Jamel M Nelson
(74) *Attorney, Agent, or Firm* — Ryan C. Stockett

(57) ABSTRACT

A print head is disclosed for use in an additive manufacturing system. The print head may include a receiving end configured to receive a matrix and a continuous reinforcement, and a discharging end configured to discharge the continuous reinforcement at least partially coated in the matrix. The print head may also include a compactor located at the discharging end and forming a tool center point for the print head.

20 Claims, 13 Drawing Sheets

(51) Int. Cl.

| | | |
|---|---|---|
| *B29C 64/165* | (2017.01) | |
| *B33Y 70/00* | (2020.01) | |
| *B33Y 30/00* | (2015.01) | |
| *B29C 64/291* | (2017.01) | |
| *B33Y 10/00* | (2015.01) | |
| *B33Y 40/00* | (2020.01) | |
| *B33Y 80/00* | (2015.01) | |
| *B29B 11/16* | (2006.01) | |
| *B29C 35/08* | (2006.01) | |
| *B29C 70/38* | (2006.01) | |
| *B29C 70/54* | (2006.01) | |
| *B32B 38/00* | (2006.01) | |
| *B32B 38/18* | (2006.01) | |

(52) U.S. Cl.
CPC ............... *B33Y 10/00* (2014.12); *B33Y 30/00* (2014.12); *B33Y 70/00* (2014.12); *B29B 11/16* (2013.01); *B29C 35/0805* (2013.01); *B29C 70/388* (2013.01); *B29C 70/543* (2013.01); *B29C 2793/0027* (2013.01); *B32B 38/0004* (2013.01); *B32B 38/1808* (2013.01); *B33Y 40/00* (2014.12); *B33Y 80/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,700,347 A | 12/1997 | McCowin |
| 5,746,967 A | 5/1998 | Hoy et al. |
| 5,866,058 A | 2/1999 | Batchelder et al. |
| 5,936,861 A * | 8/1999 | Jang ...................... B33Y 70/00 700/98 |
| 6,026,883 A | 2/2000 | Hegerhorst et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 * | 2/2016 | Fuerstenberg .......... B29C 70/30 264/480 |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0176120 A1 * | 6/2016 | Skubic ................. B29C 64/106 425/376.1 |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |

(56) References Cited

U.S. PATENT DOCUMENTS

| | | |
|---|---|---|
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kune et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0341300 A1 | 11/2017 | Rudolph et al. |
| 2017/0348874 A1 | 12/2017 | Grohmann et al. |

FOREIGN PATENT DOCUMENTS

| | | |
|---|---|---|
| CN | 107379539 B * | 1/2020 |
| DE | 4102257 A1 | 7/1992 |
| EP | 1878563 A1 | 1/2008 |
| EP | 2433784 A1 | 3/2012 |
| EP | 2594389 A1 | 5/2013 |
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon ROH, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert p. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Jul. 18, 2019 for PCT/US2019/025663 to CC3D LLC Filed Apr. 3, 2019.

* cited by examiner

SYSTEM AND PRINT HEAD FOR ADDITIVE MANUFACTURING SYSTEM

RELATED APPLICATIONS

This application is based on and claims the benefit of priority from U.S. Provisional Application No. 62/656,155 that was filed on Apr. 11, 2018, the contents of which are expressly incorporated herein by reference.

TECHNICAL FIELD

The present disclosure relates generally to a manufacturing system and, more particularly, to a print head for an additive manufacturing system.

BACKGROUND

Continuous fiber 3D printing (a.k.a., CF3D™) involves the use of continuous fibers embedded within material discharging from a movable print head. A matrix is supplied to the print head and discharged (e.g., extruded and/or pultruded) along with one or more continuous fibers also passing through the same head at the same time. The matrix can be a traditional thermoplastic, a liquid thermoset (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although continuous fiber 3D printing provides for increased strength, compared to manufacturing processes that do not utilize continuous fiber reinforcement, care must be taken to ensure proper wetting of the fibers with the matrix, proper cutting of the fibers, automated restarting after cutting, proper compaction of the matrix-coated fibers after discharge, and proper curing of the compacted material. The disclosed print head and system are directed at addressing one or more of these issues and/or other problems of the prior art.

SUMMARY

In one aspect, the present disclosure is directed to a print head for an additive manufacturing system. The print head may include a receiving end configured to receive a matrix and a continuous reinforcement, and a discharging end configured to discharge the continuous reinforcement at least partially coated in the matrix. The print head may also include a compactor located at the discharging end and forming a tool center point for the print head.

In another aspect, the present disclosure is directed to a method of additively manufacturing a composite structure. The method may include directing a matrix and a continuous reinforcement into a nozzle-less print head, and passing the continuous reinforcement through a guiding module that maintains alignment of the continuous reinforcement. The method may also include compacting the matrix and the continuous reinforcement at discharge from the nozzle-less print head with a compactor, and exposing the matrix to a cure energy after compacting.

DETAILED DESCRIPTION

Figure 1:
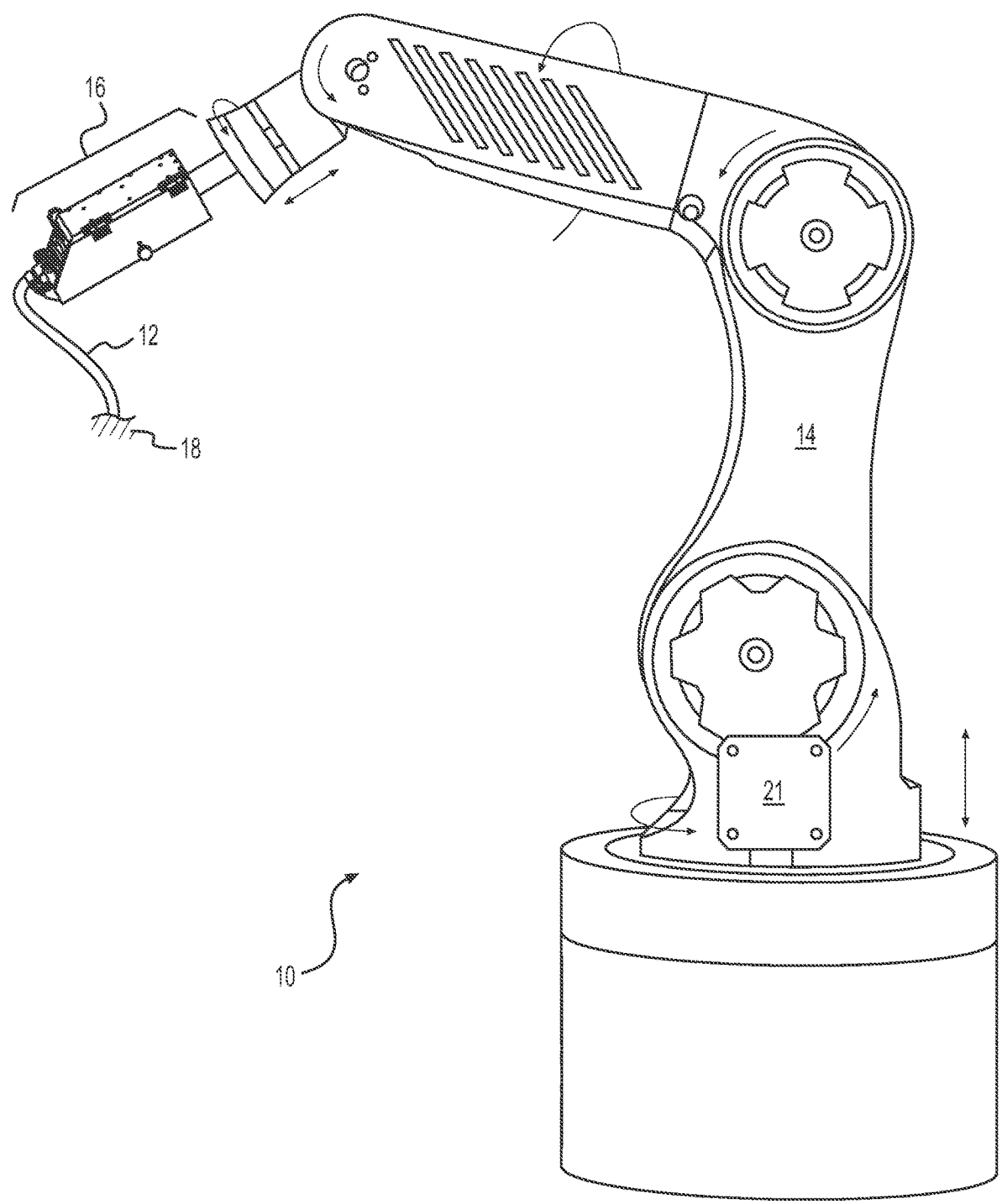
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized. In some embodiments, a drive may mechanically couple head 16 to support 14, and include components that cooperate to move and/or supply power or materials to head 16.

Head 16 may be configured to receive or otherwise contain a reinforcement that is at least partially coated in a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In some instances, the matrix material inside head 16 may need to be kept cool and/or dark in order to inhibit premature curing or otherwise obtain a desired rate of curing after discharge. In other instances, the matrix material may need to be kept warm for similar reasons. In either situation, head 16 may be specially configured (e.g., insulated, temperature-controlled, shielded, etc.) to provide for these needs.

When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16. The matrix, dry reinforcements, and/or reinforcements that are already exposed to the matrix (e.g., wetted reinforcements) may be transported into head 16 in any manner apparent to one skilled in the art.

The matrix material and/or reinforcement may be discharged from head 16 via at least two different modes of operation. In a first mode of operation, the matrix material and/or reinforcement are extruded (e.g., pushed under pressure and/or mechanical force) from head 16 as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 16 as a result of head 16 moving away from an anchor point 18. In particular, at the start of structure formation, a length of matrix-impregnated reinforcement may be pulled and/or pushed from head 16, deposited onto anchor point 18, and cured such that the discharged material adheres (or is otherwise coupled) to anchor point 18. Thereafter, head 16 may be moved away from anchor point 18, and the relative movement may cause the reinforcement to be pulled from head 16. It should be noted that the movement of reinforcement through head 16 could be assisted (e.g., via internal head mechanisms), if desired. However, the discharge rate of reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.—not shown in FIG. 1) may form a portion of head 16 and be configured to enhance a cure rate and/or quality of the matrix as it is discharged from head 16. The cure enhancer(s) may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 16.

A controller 21 may be provided and communicatively coupled with support 14 and head 16. Controller 21 may embody a single processor or multiple processors that include a means for controlling an operation of system 10. Controller 21 may include one or more general-or special-purpose processors or microprocessors. Controller 21 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 21, including power supply circuitry, signal-conditioning circuitry, solenoid/motor driver circuitry, communication circuitry, and other appropriate circuitry. Moreover, controller 21 may be capable of communicating with other components of system 10 via wired and/or wireless transmission.

One or more maps may be stored in the memory of controller 21 and used during fabrication of structure 12. Each of these maps may include a collection of data in the form of models, lookup tables, graphs, and/or equations. In the disclosed embodiment, the maps are used by controller 21 to determine desired characteristics of the cure enhancer(s), the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 21 may then correlate operation of support 14 (e.g., the location and/or orientation of head 16) and/or the discharge of material from head 16 (a type of material, desired performance of the material, cross-linking requirements of the material, a discharge rate, etc.), such that structure 12 is produced in a desired manner.

Figure 2:
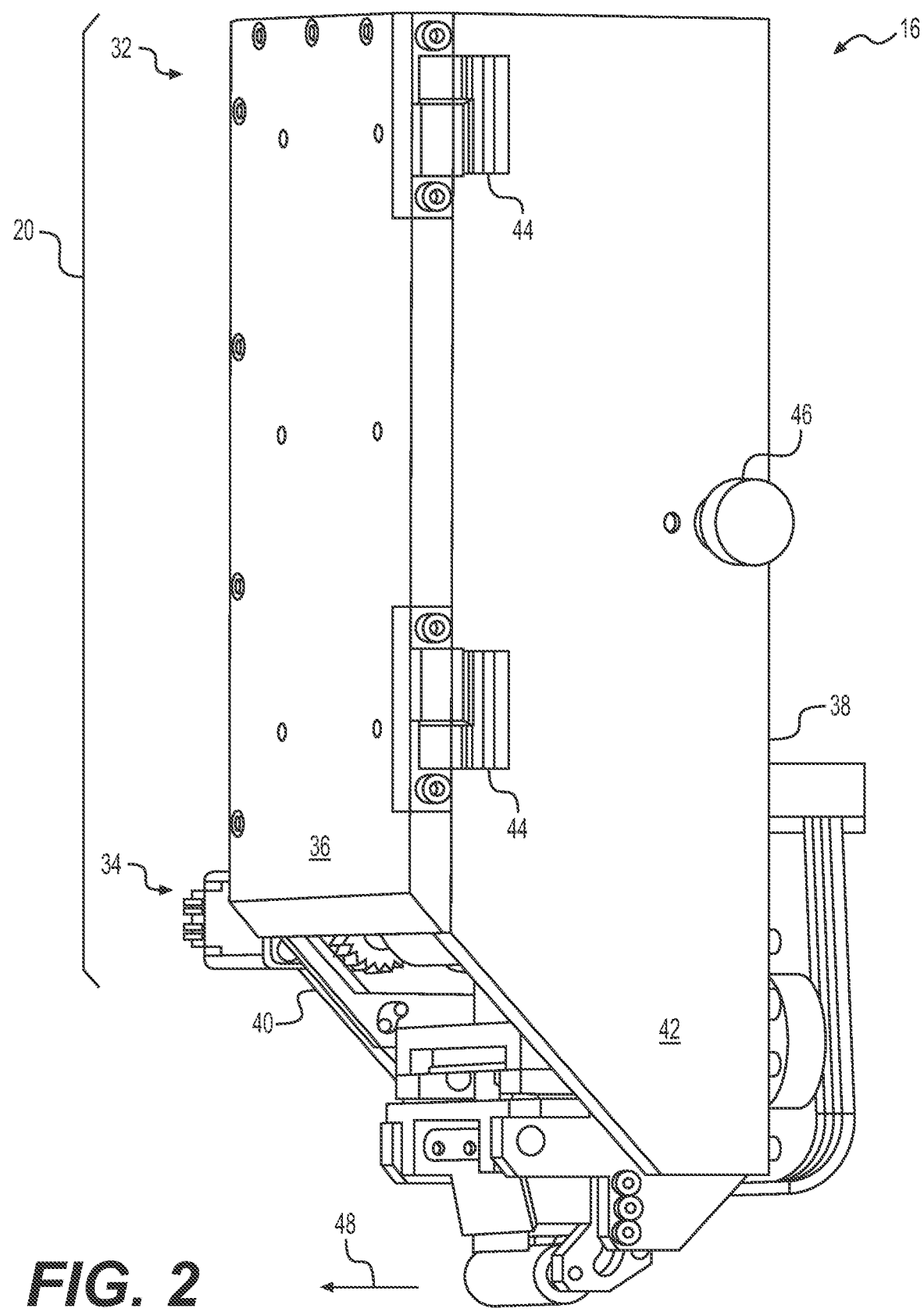
FIGS. 2 and 3 are diagrammatic illustrations of an exemplary disclosed head that may be utilized with the manufacturing system of FIG. 1.
Figure 3:
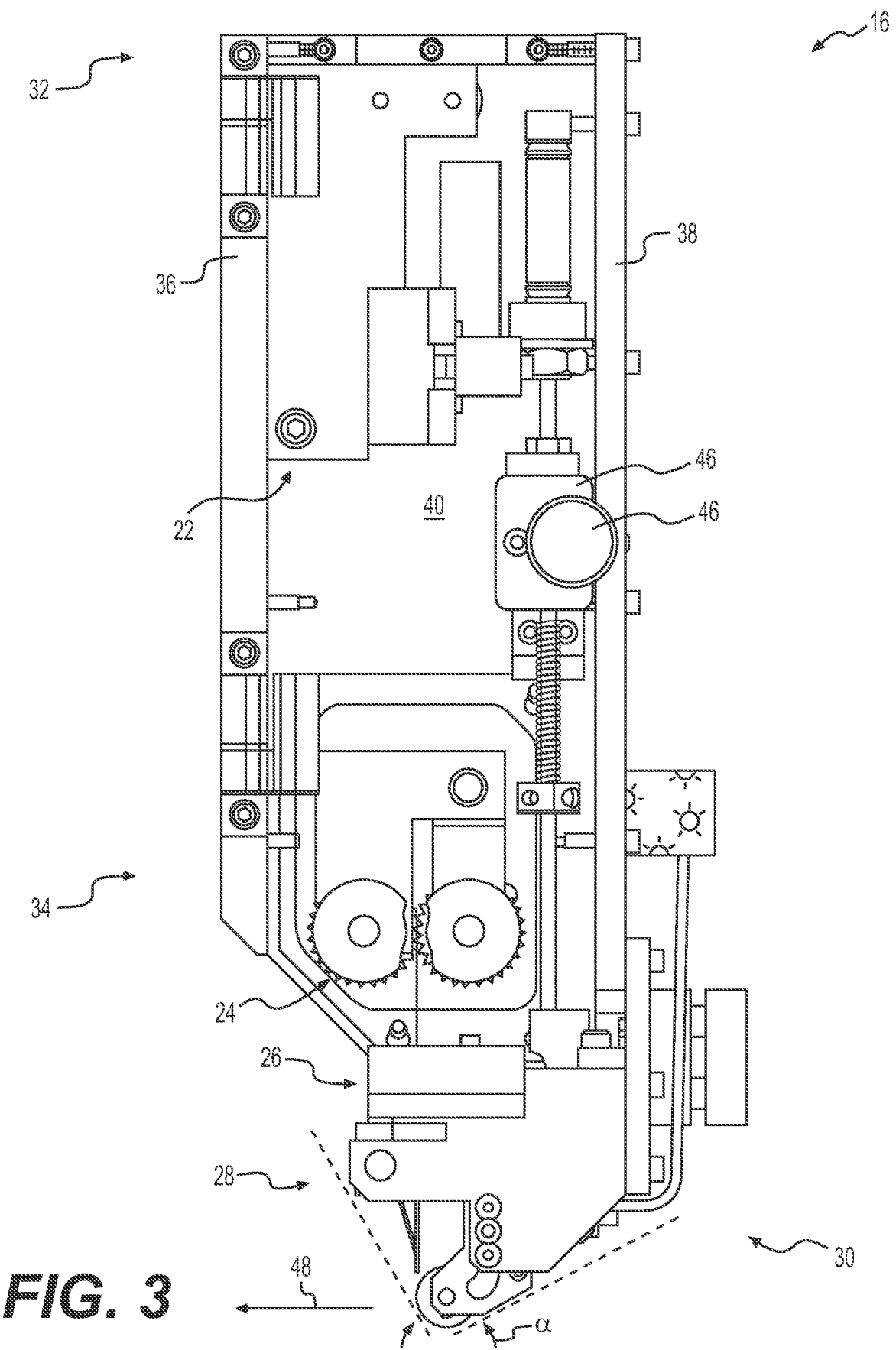

An exemplary head 16 is disclosed in greater detail in FIGS. 2 and 3. Head 16 may include, among other things, a housing 20 that is configured to hold, enclose, contain, or otherwise provide mounting for a guiding module 22, a feeding module 24, a cutting module 26, a compacting module 28, and a curing module 30. It should be noted that additional and/or different modules (e.g., a fiber storage module, a tension management module, an impregnation module, etc.) could be included, if desired. As will be described in more detail below, the matrix, dry reinforcements, and/or matrix-wetted reinforcements described above may be received via guiding module 22, selectively advanced by feeding module 24, severed by cutting module 26, compressed by compacting module 28, and hardened or otherwise cured by curing module 30.

Housing 20 may include any number of panels connected to each other to form a multi-sided enclosure that supports the remaining components of head 16, while also restricting penetration of ambient energy (e.g., UV light), which could negatively affect print quality. In the disclosed embodiment, the enclosure is generally four-sided, having a receiving or upper end 32 and a discharging or lower end 34 that are both at least partially open. It is contemplated that the enclosure may have a greater or lesser number of sides, if desired. The four sides of housing 20 may include a lead panel 36, a trail panel 38 located opposite lead panel 36, a side panel 40 fixed (e.g., bolted, welded, chemically bonded, or otherwise integrally fabricated) between lead and trail panels 36, 38, and a door 42 (omitted from FIG. 3 for clarity) located opposite side panel 40. Door 42 may be pivotally connected to one of lead and trail panels 36, 38 via one or more hinges 44, and selectively connected to the other of lead and trail panels 36, 38 via a latch (e.g., a magnetic latch) 46. It is contemplated, however, that other means of removably connecting door 42 to the rest of housing 20 could be implemented.

Lead panel 36 may be located at a leading side of head 16, relative to a normal travel direction (represented by an arrow 48) of head 16. Lead panel 36 may embody a flat plate having a generally rectangular shape, although other contours and shapes are contemplated. A width of lead panel 36 may be narrower than a length thereof (e.g., less than ½ of the length), and a thickness of lead panel 36 may be less than the width. Receiving end 32 of lead panel 36 may have a square edge, while discharging end 34 of lead panel 36 may be chamfered inward. A plurality of through-holes may be formed around a perimeter of lead panel 36 for use in connecting lead panel 36 to the other panels. In addition, any number of through- and/or blind-holes may be formed within a center field of lead panel 36 for use in mounting any of the above-listed modules.

Trail panel 38 may be located at a trailing side of head 16, relative to the normal travel direction of head 16. Trail panel 38, like lead panel 36, may embody a flat plate having a generally rectangular shape. Trail panel 38 may have the same general width and thickness as lead panel 36, but a greater length. Receiving end 32 of trail panel 38 may have a square edge that is generally aligned with the square edge of lead panel 36, while discharging end 34 of trail panel 38 may extend past the chamfered edge of lead panel 36. Discharging end 34 of trail panel 38 may or may not be chamfered. A plurality of through-holes may be formed around a perimeter of trail panel 38 for use in connecting trail panel 38 to the other panels. In addition, any number of through- and/or blind-holes may be formed within a center field of trail panel 38 for use in mounting any of the above-listed modules.

Side panel 40 and door 42 may be substantially identical in shape and size. Each of side panel 40 and door 42 may embody a flat plate having a polygonal shape, with receiving end 32 being generally square and discharging end 34 being angled. Discharging ends 34 of side panel 40 and door 42 may have square edges that extend from the chamfered edge of lead panel 36 to the square edge of trail panel 38. A plurality of through-holes may be formed around the perimeters of side panel 40 and/or door 42 for connection to lead and/or trail panels 36, 38. In addition, any number of through- and/or blind-holes may be formed within center fields of side panel 40 and/or door 42 for use in mounting any of the above-listed modules.

As shown in FIG. 3, guiding module 22 may be located generally at receiving end 32 of housing 20. In some embodiment, guiding module 22 may extend out of housing 20 a distance past receiving end 32. In other embodiments, portions of guiding module 22 may extend (e.g., partially or completely) to feeding module 24, such that matrix-wetted reinforcements are supported and/or guided for a greater length inside of head 16. It is also contemplated that guiding module 22 (or a similar wetting module) could be located closer to feeding module 24 than receiving end 32 or be completely outside of housing 20 and upstream of head 16, if desired.

Figure 4:
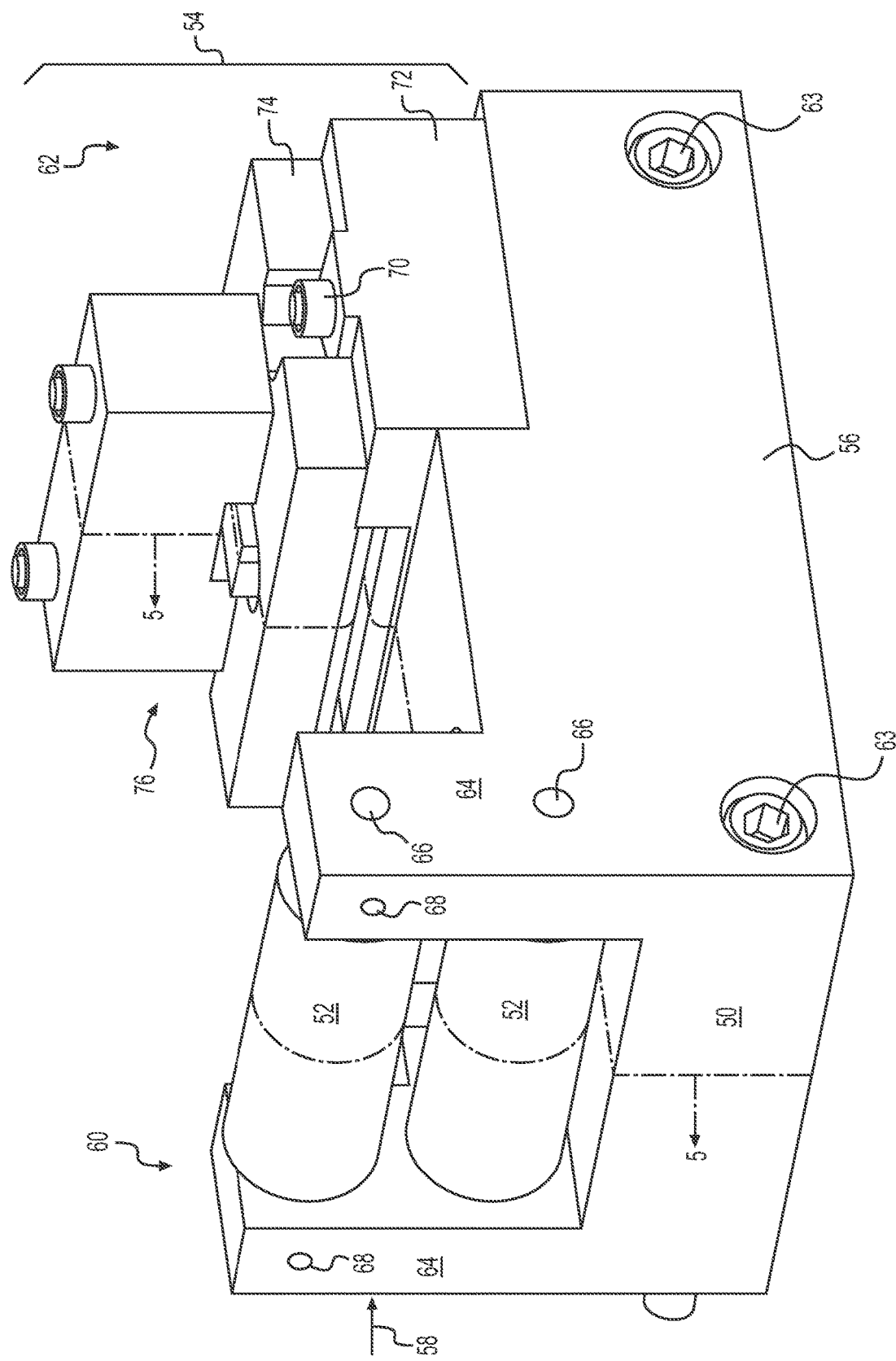
FIGS. 4 and 5 are diagrammatic illustrations of an exemplary guiding module that may form a portion of the print head of FIGS. 2 and 3.
Figure 5:
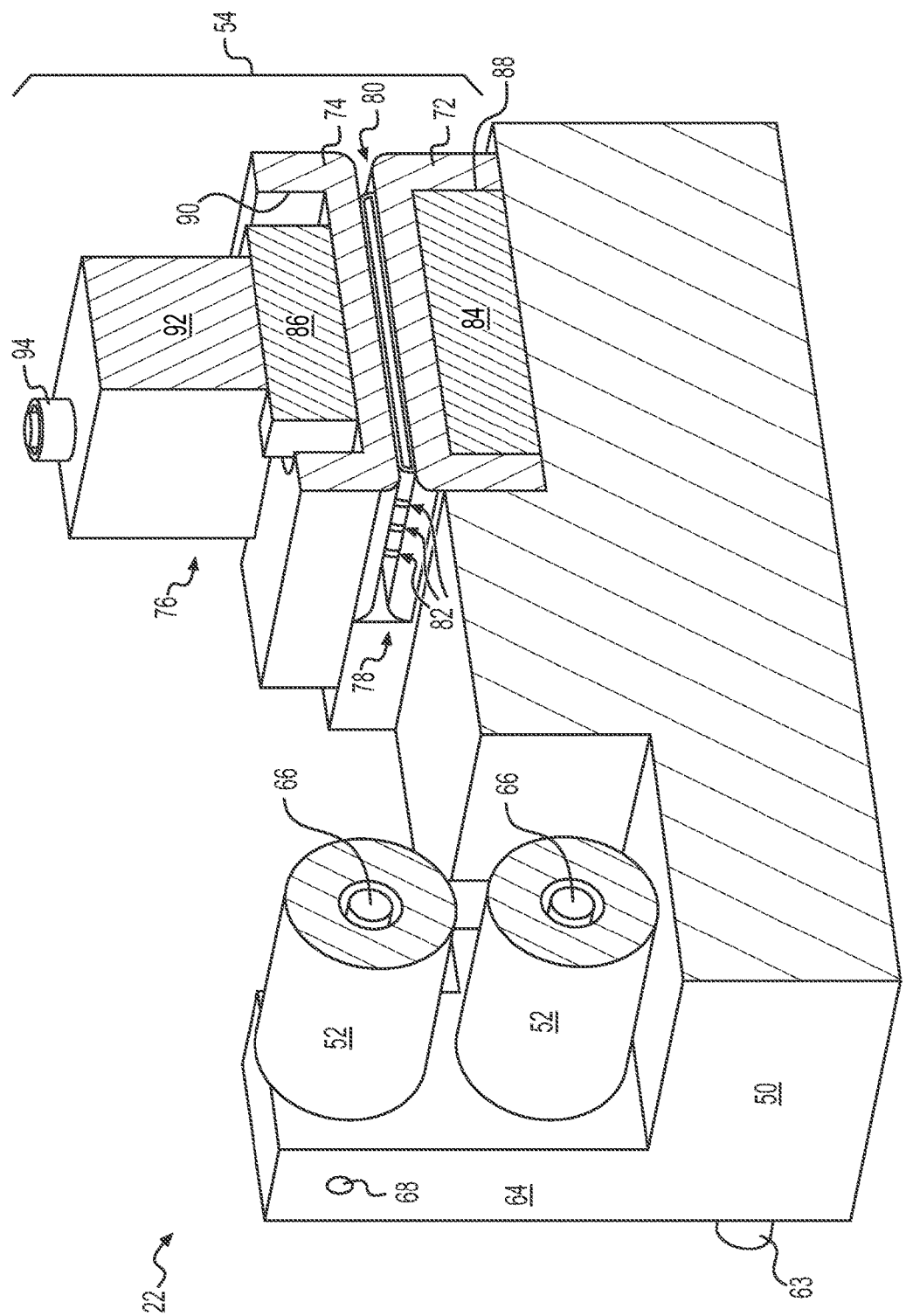

Guiding module 22 may include components that cooperate to receive matrix, dry reinforcements, and/or matrix-wetted reinforcements at receiving end 32 of housing 20, and to combine, support, and/or guide the materials to feeding module 24. As shown in FIGS. 4 and 5, these components may include, among other things, a base 50, one or more entrant rollers 52 operatively connected to an end of base 50, and a piloting subassembly 54 located opposite entrant roller(s) 52. The reinforcements (e.g., dry and/or matrix-wetted reinforcements) may pass first over entrant roller(s) 52 and then through piloting subassembly 54, where the reinforcements are aligned in a desired sequence and orientation, and caused to converge (e.g., such that a small gap or no gap exists between adjacent reinforcements).

It should be noted that, in some embodiments, matrix may be first or supplementally introduced to the reinforcements by guiding module 22. For example, as the reinforcements pass through rollers 53 and/or into piloting subassembly 54, matrix may be applied to the reinforcements. The reinforcements may pass through a matrix bath, pass through a matrix flow, be sprayed with matrix, or otherwise receive at least a partially coating of matrix (e.g., a layer of matrix on at least one side). In some embodiments, contact with rollers 53 and/or surfaces within piloting subassembly 54 (e.g., surfaces that extend into a straight-line trajectory of the reinforcements, causing the reinforcements to be diverted) may generate a pressure differential through the reinforcements that urges the matrix coating to disburse and/or flow through the reinforcements. As the reinforcements exit guiding module 22, the reinforcements may be fully wetted with a desired amount of matrix. Any excess matrix and/or reinforcement debris (e.g., fiber shards, dust, etc.) may drip or be forced (e.g., pushed and/or pulled) off the reinforcements inside of or just downstream of guiding module 22. In some embodiments, a low-pressure area within guiding module 22 may help to remove the excess matrix. It is contemplated that a rate of matrix application may be coordinated with a volumetric rate of reinforcements passing through guiding module 22, such that the need to remove excess matrix is reduced.

Base 50 of piloting subassembly 54 may function as a mounting platform for the remainder of guiding module 22, and itself be removably connected to housing 20 (referring to FIGS. 2 and 3). For example, base 50 may include a back portion 56 that extends lengthwise in the general direction of reinforcement-travel through guiding module 22 (indicated by an arrow 58), from an entrance end 60 to an exit end 62. Base 50 may be connectable to housing 20 (e.g., to side panel 40) in any manner known in the art (e.g., via threaded fasteners, quick-release couplings, and other similar mechanisms 63), such that guiding module 22 can periodically be removed as an integral unit for adjustment, cleaning, repair, and/or replacement. One or more ears 64 may extend in a normal direction from back portion 56 at entrance end 60, and entrant roller(s) 52 may be rotatably connected between distal ends of ears 64 (e.g., via corresponding pins 66, bearings—not shown, bushings—not shown, and/or set screws 68). Piloting subassembly 54 may be mounted to back portion 56 at exit end 62 (e.g., at a same side from which ears 64 extend) in any manner known in the art (e.g., via one or more threaded fasteners 70). In one embodiment, base 50 is fabricated from a low-weight and/or low-friction material (e.g., aluminum, Teflon, Delrin, nylon, etc.), such that a weight of head 16 may be kept low. In other embodiments, however, base 50 may be fabricated from a ferromagnetic material (e.g., iron, stainless steel, etc.), for magnetic use with piloting subassembly 54 (described in more detail below).

Entrant roller(s) 52 may be fabricated from a relatively compliant and/or low-friction type of material. For example, entrant roller(s) 52 may be fabricated from aluminum, steel, Delrin, Teflon, nylon, or another similar material known in the art. Entrant roller(s) 52 may have a diameter of about 0.25-5.0", and an outer annular surface that is smooth, porous, or roughened (e.g., knurled) to reduce drag, inhibit fiber breakage and/or separation, maintain orientation and/or integrity of the fibers, and to reduce wear. It is contemplated that, in some instances, a scraper and/or catch reservoir could be associated with entrant roller(s) 52, if desired, to remove and/or collect excess resin. In applications that utilize multiple entrant rollers 52, it is contemplated that entrant rollers 52 may be biased towards each other (e.g., by a spring—not shown) and used to squeeze out excess resin (if already applied to the reinforcements passing therethrough). In these applications, it may be helpful to drive entrant rollers 52 and thereby reduce drag. A location of (e.g., a spacing between) entrant roller(s) 52 may be adjustable.

It should be noted that, although a single entrant roller 52 is illustrated at each side of the reinforcements passing thereby, it is contemplated that multiple separate rollers (e.g., one roller per reinforcement or reinforcement grouping) could alternatively be used. This may allow for entrant roller(s) 52 to accommodate different travel speeds of the reinforcements that are experienced during cornering of head 16.

Piloting subassembly 54 may include multiple components that cooperate to keep individual reinforcements within a desired alignment and transverse sequence as they pass out of head 16 (e.g., by way of feeding module 24, cutting module 26, and compacting module 28), while also causing the individual reinforcements to converge transversely towards each other for reduced porosity. These components may include, among other things, a channeling base 72, a cover 74, and a latching mechanism 76. Channeling base 72 may have a leading end 78 and a trailing end 80, with inner and outer primary surfaces that extend therebetween. The outer surface of channeling base 72 may mate against back portion 56 of base 50, while the inner surface may engage (e.g., continuously or only periodically) the wetted reinforcements as they pass through piloting subassembly 54. Edges of the inner surface at one or both of leading and trailing ends 78, 80 may be rounded to reduce a likelihood of damaging the reinforcements. Cover 74 may have an inner surface that is substantially identical to and oriented in mirrored-opposition to the inner surface of channeling base 72.

In one embodiment, any number of fiber-separating and/or pressure-generating features (e.g., dividers, channels, grooves, vanes, fins, rollers, lobes, etc.) 82 may be formed within a space between channeling base 72 and cover 74. Features 82 may be integral with channeling base 72 and/or cover 74 (e.g., extending inward), or completely separate components, as desired. Features 82 may extend in the reinforcement-travel direction, and be spaced at regular intervals in a transverse direction. The spacing between features 82 may correspond with a desired fiber-to-resin ratio. For example, a desired ratio of 60% may drive a cross-sectional area in the spacing between features 82 to be about 40% greater than a cross-sectional area of reinforcements passing through the spacing allowing for the area not filled with reinforcements to be filled with matrix. In some embodiments, a width direction (relative to a resulting ribbon) of the cross-sectional area between features is greater than a thickness direction, such that more matrix is deposited between reinforcements rather than at an outer surface of the ribbon. It is contemplated that features 82 may be generally parallel with each other along their entire length, or converge toward the exit end of piloting subassembly 54. For example, a spacing between features 82 may decrease along their length. For example, a taper angle of features 82 may be about 0-10°. In addition, in some embodiments, a spacing between channeling base 72 and cover 74 may remain consistent in the reinforcement-travel direction, or decrease to provide for greater convergence of the wetted-reinforcements. Features 82 may be fabricated from a low-friction material (e.g., aluminum, Delrin, Teflon, nylon, etc.), and a spacing between features may be about 0.02-1.0". It is contemplated that features 82 may be interconnected (e.g., via a webbing or a plate) and replaceable as a single unit (e.g., for a unit having different spacings, sizes, shapes, materials, etc.).

Cover 74 may be held in a particular location and/or orientation relative to channeling base 72 by way of latching mechanism 76, such that the matrix-wetted reinforcements passing through guiding module 22 are trapped between cover 74 and channeling base 72. It is contemplated that any type of latching mechanism may be used for this purpose. In the disclosed embodiment, latching mechanism 76 is a magnetic-type of mechanism. Specifically, latching mechanism 76 may include at least one magnet (e.g., base and cover magnets 84, 86) associated with at least one of channeling base 72 and cover 74. Base magnet 84 may be trapped between channeling base 72 and back portion 56 of base 50 (e.g., within a recess 88 of channeling base 72). Cover magnet 86 may similarly be trapped within a recess 90 of cover 74, for example via a lid 92 that is removably connected to cover 74 (e.g., via threaded fasteners 94). It should be noted that, while two magnets (e.g., base and cover magnets 84, 86) are shown as being centered over a travel path of the reinforcements, a greater or lesser number of magnets may be used and located outward from the travel path (e.g., at the sides of the travel path), if desired. During operation, cover 74, cover magnet 86, lid 92, and fastener 94 may together be removed as a single unit from the rest of piloting subassembly 76 for easier threading of the matrix-wetted reinforcements through guiding module 22. It is also contemplated that cover 74, cover magnet 86, lid 92, and fastener 94 could be a single integral component, if desired. Likewise, back portion 56, channeling base 72, base magnet 84, and fastener 70 could be a single integral component, if desired.

Figure 6:
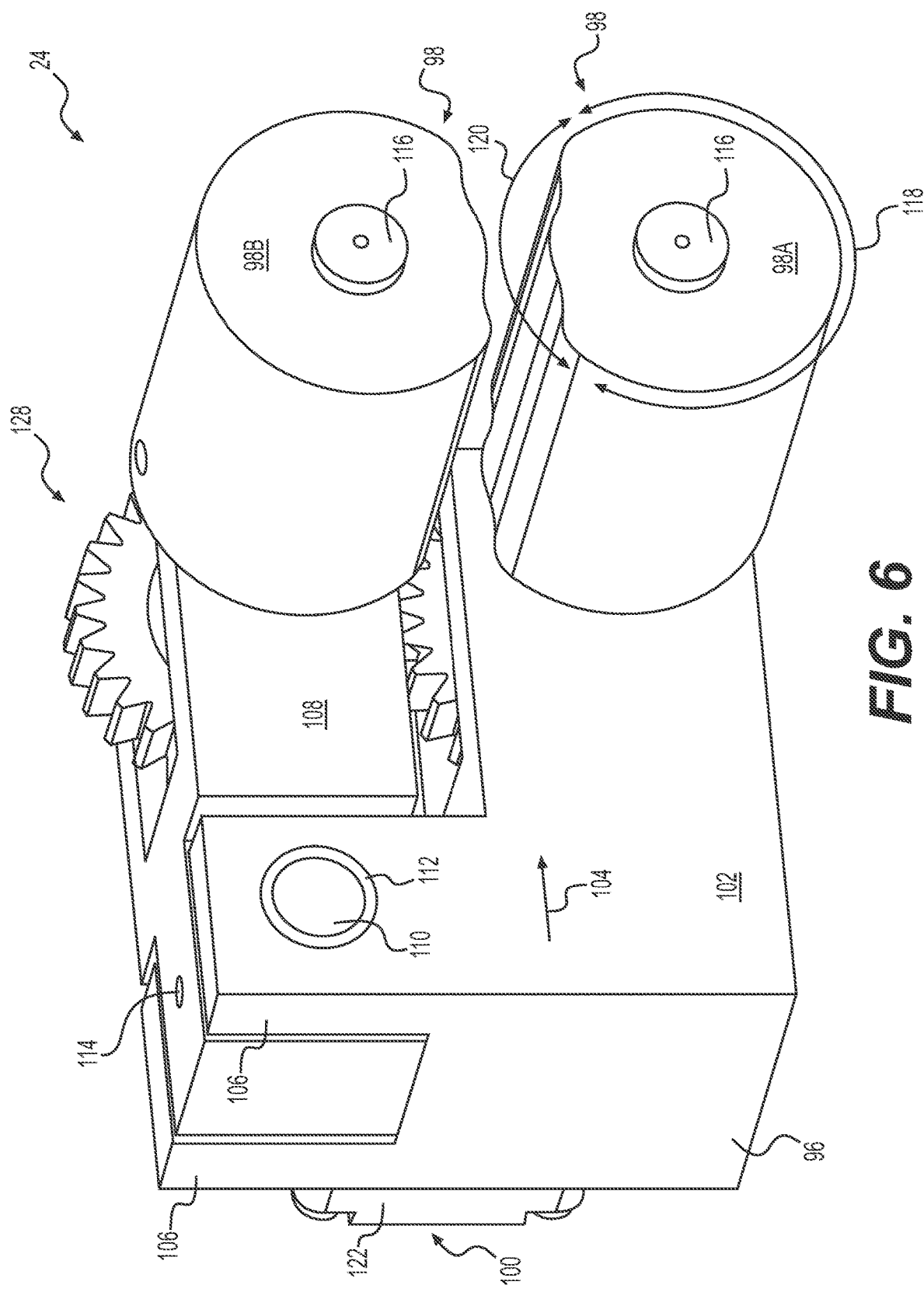
FIGS. 6 and 7 are diagrammatic illustrations of an exemplary feeding module that may form a portion of the print head of FIGS. 2 and 3.
Figure 7:
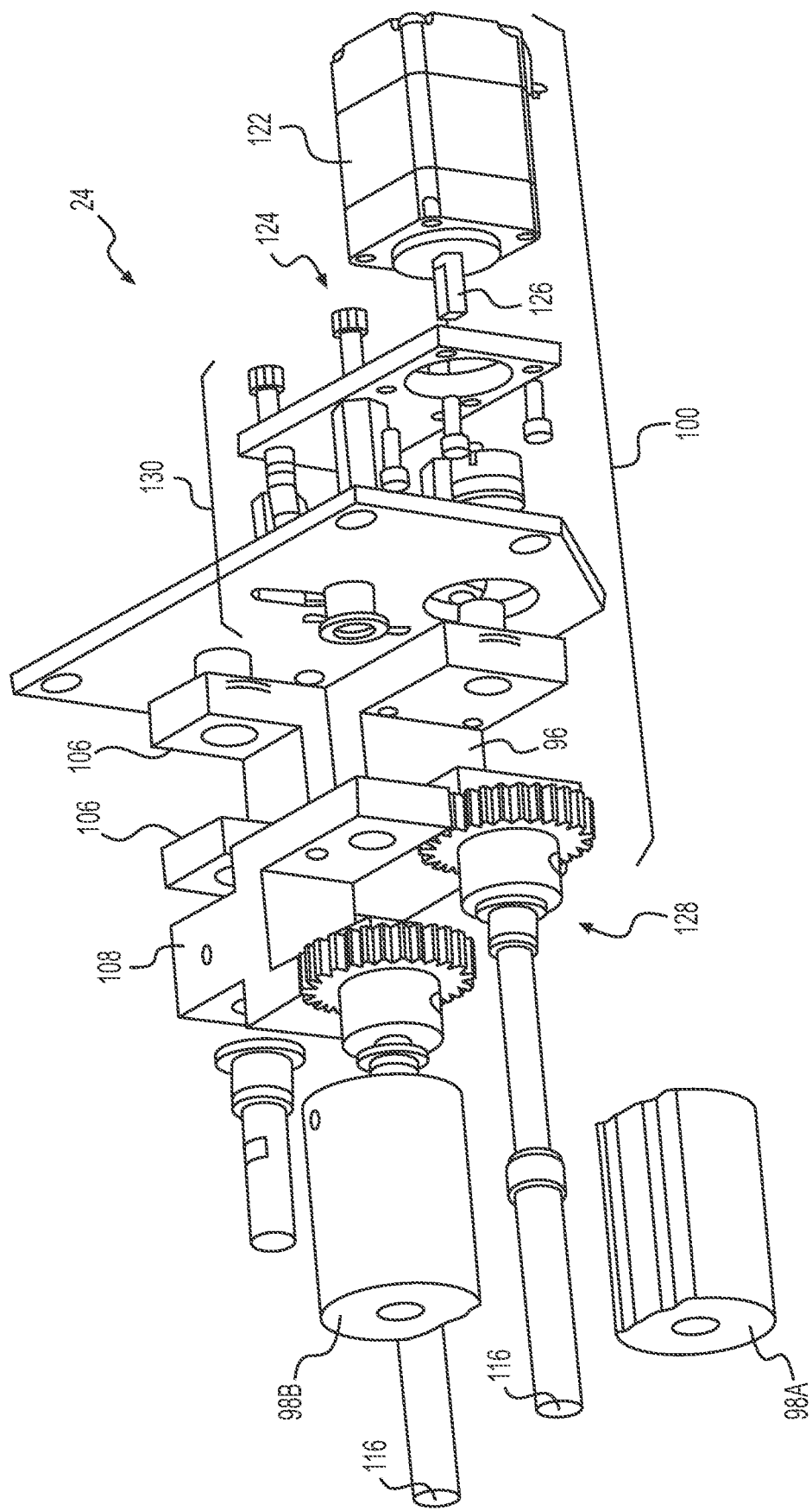

Feeding module 24 may receive (e.g., pull) the matrix-wetted reinforcements from guiding module 22 and selectively push the reinforcements further through head 16 (e.g., through cutting module 26 to compacting module 28). As shown in FIGS. 6 and 7, feeding module 24 may be an assembly of multiple components. These components may include, among other things, a base 96, one or more rollers 98 operatively supported by base 96, and a drive 100 that is operatively connected to base 96 and configured to power the rotation of roller(s) 98.

Base 96 may function as a mounting platform for the remainder of feeding module 24, and itself be removably connected to housing 20 (referring to FIGS. 2 and 3). For example, base 96 may include a back portion 102 that extends lengthwise in the general direction of reinforcement-travel through feeding module 24 (indicated by an arrow 104). Base 96 may be connectable to housing 20 (e.g., to side panel 40) in any manner known in the art (e.g., via threaded fasteners—not shown), such that feeding module 24 can periodically be removed as an integral unit for adjustment, cleaning, repair, and/or replacement. One or more ears 106 may extend in a normal direction from back portion 102, and a yoke 108 may be rotatably connected between distal ends of ears 106 (e.g., via corresponding pins 110, bearings 112, and/or set screws 114). In some embodiments, a spring (not shown) may be located to rotationally bias yoke 108 toward back portion 102.

In the disclosed embodiments shown in FIGS. 6 and 7, two feed rollers 98 are utilized, including a directly driven roller 98A and a slave roller 98B. One of rollers 98A, 98B (e.g., directly driven roller 98A) may be pivotally mounted to back portion 102 of base 96 (e.g., at an end opposite ears 106), while the other of rollers 98A, 98B (e.g., slave drive roller 98B) may be pivotally mounted to a distal end of yoke 108. Rollers 98 may be connected to base 96 and/or yoke 108 via cantilevered axles 116, bearings (not shown), bushings, splines, clips (not shown), set screws (not shown), spacers, keyways, end-stops, etc., such that rollers 98 are maintained in general alignment with entrant roller 52 and features 82 in guiding module 22.

At least one of rollers 98 may be an eccentric wheel, cylinder, or cam having an irregular shape that imparts movement to the wetted-reinforcement only during part of the roller's rotation. For example, FIGS. 6 and 7 illustrate an outer periphery of each roller 98 as including a first portion 118 having a substantially constant radius, and a remaining portion 120 having a reduced radius (e.g., a constant reduced radius, a variably reduced radius, and/or one or more connected splines or linear segments located closer to an axis or rotation than the radius of first portion 118). During operation, rollers 98A and 98B may be synchronized, such that transition points between the first and remaining portions 118, 120 pass through a straight line drawn between the axes of rollers 98A, 98B at the same time. With this configuration, any time that any part of first portions 118 are passing through the straight line between the axes of rollers 98A, 98B, the rollers are contacting and exerting force on the wetted-reinforcements. And in contrast, any time that any part of remaining portions 120 are passing through the straight line between the axes of rollers 98A, 98B, a clearance exists around the wetted-reinforcements (i.e., no force is being exerted). The spring described above may bias rollers 98 towards each other, particularly during pushing of the matrix-wetted reinforcement, such that rollers 98 are able to adequately grip the reinforcement. It is contemplated that only one of rollers 98 may be eccentric or cam-like and driven, while the other roller 98 is concentric, pliable, and only rotates when the larger-diameter portion of the eccentric roller 98 is engaged therewith. It is also contemplated that a pair of rollers 98 may be provided separately for each individual tow of reinforcements passing through feeding module 24, if desired.

Rollers 98 may primarily be used during start of a new printing event, when a free end of matrix-wetted reinforcement must be pushed out of head 16. An arc length of first portion 118 may be selected to push a desired length of matrix-wetted reinforcement from head 16 for start of the new printing event. In one embodiment, this arc length may be about equal to or greater than a distance between cutting module 26 (e.g., a cut location within cutting module 26) and compacting module 28 (e.g., a compacting location at compacting module 28).

Rollers 98, like entrant roller(s) 52, may be fabricated from a relatively compliant and/or low-friction type of material. For example, rollers 98 may be fabricated from aluminum, steel, Delrin, Teflon, nylon, urethane, or another similar material known in the art. Rollers 98 may have a diameter of about 0.25-5.0", and an outer annular surface that is porous and/or roughened (e.g., knurled) to provide traction, and/or to maintain orientation and/or integrity of the fibers. It is contemplated that, in some instances, a scraper and/or catch reservoir could be associated with rollers 98, if desired, to remove and/or collect excess resin. In some applications, a location of (e.g., a spacing between) entrant rollers 98 may be adjustable. It is also contemplated that a blade or other cutting mechanism (not shown) could form a portion of one or both of rollers 98, if desired.

Drive 100 may be configured to selectively power the rotation of rollers 98. Drive 100 may include, among other things, an actuator 122, and a linkage 124 operatively connecting actuator 122 to one or both of rollers 98. In the disclosed embodiment, actuator 122 is a motor (e.g., an electric stepper motor). It is contemplated, however, that other types of actuators could be used, if desired. Linkage 124 may include any component(s) known in the art for connecting an actuator to a roller. In the disclosed example, linkage 124 includes a stub-shaft 126 configured to engage (e.g., internally engage) the axle 116 associated with roller 98A for direct drive or roller 98A. Linkage 124 may additionally include a gear train (e.g., two or more intermeshing spur or helical gears) and/or belt/pulley arrangement 128 that links the rotation of roller 98A with the rotation of roller 98B. Any number and type of hardware components (e.g., mounting plates, spacers, bushings, clips, fasteners, etc.) 130 may be used to connect actuator 122 with the rest of feeding module 24 and or housing 20.

Figure 8:
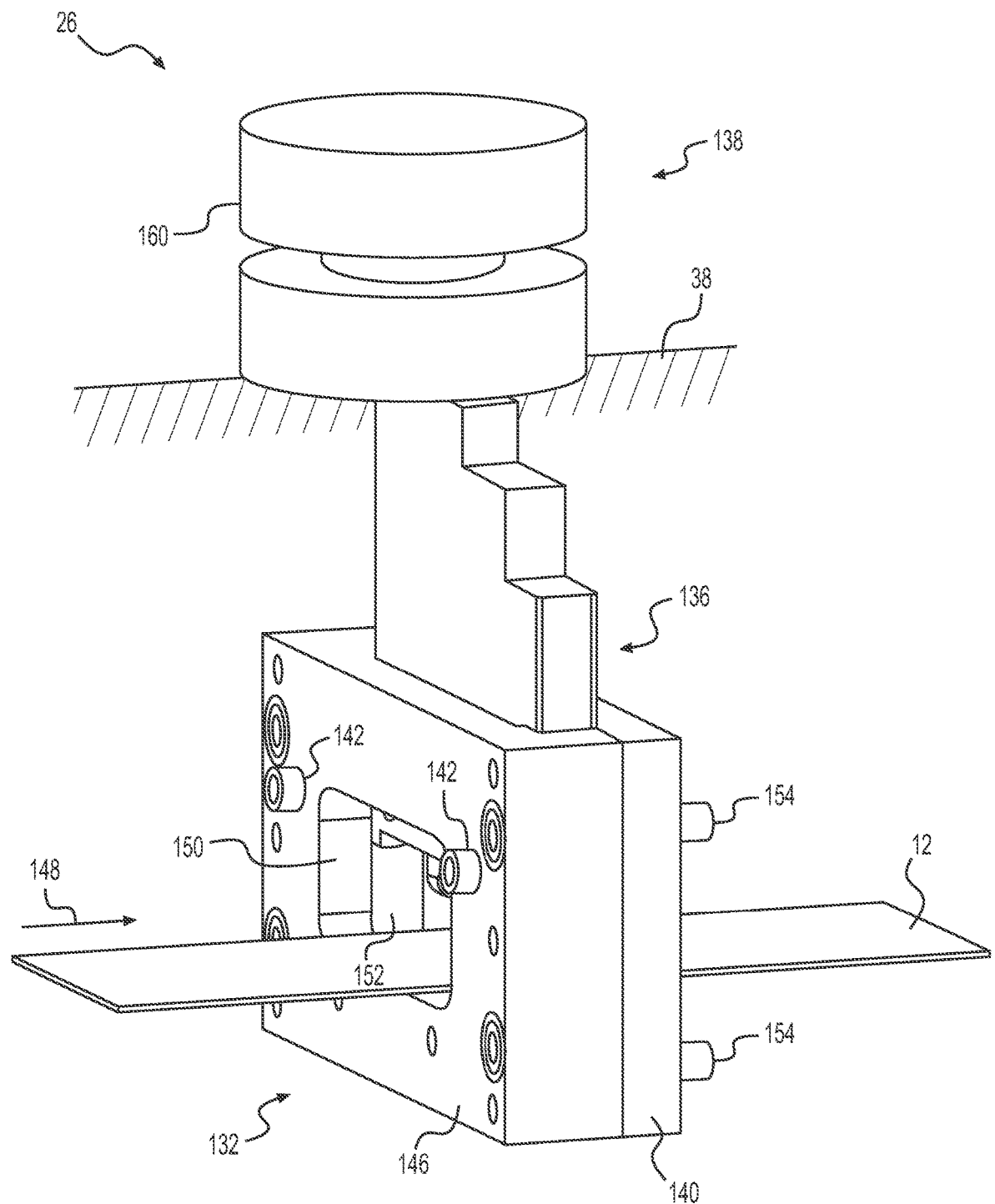
FIGS. 8 and 9 are diagrammatic illustrations of an exemplary cutting module that may form a portion of the print head of FIGS. 2 and 3.
Figure 9:
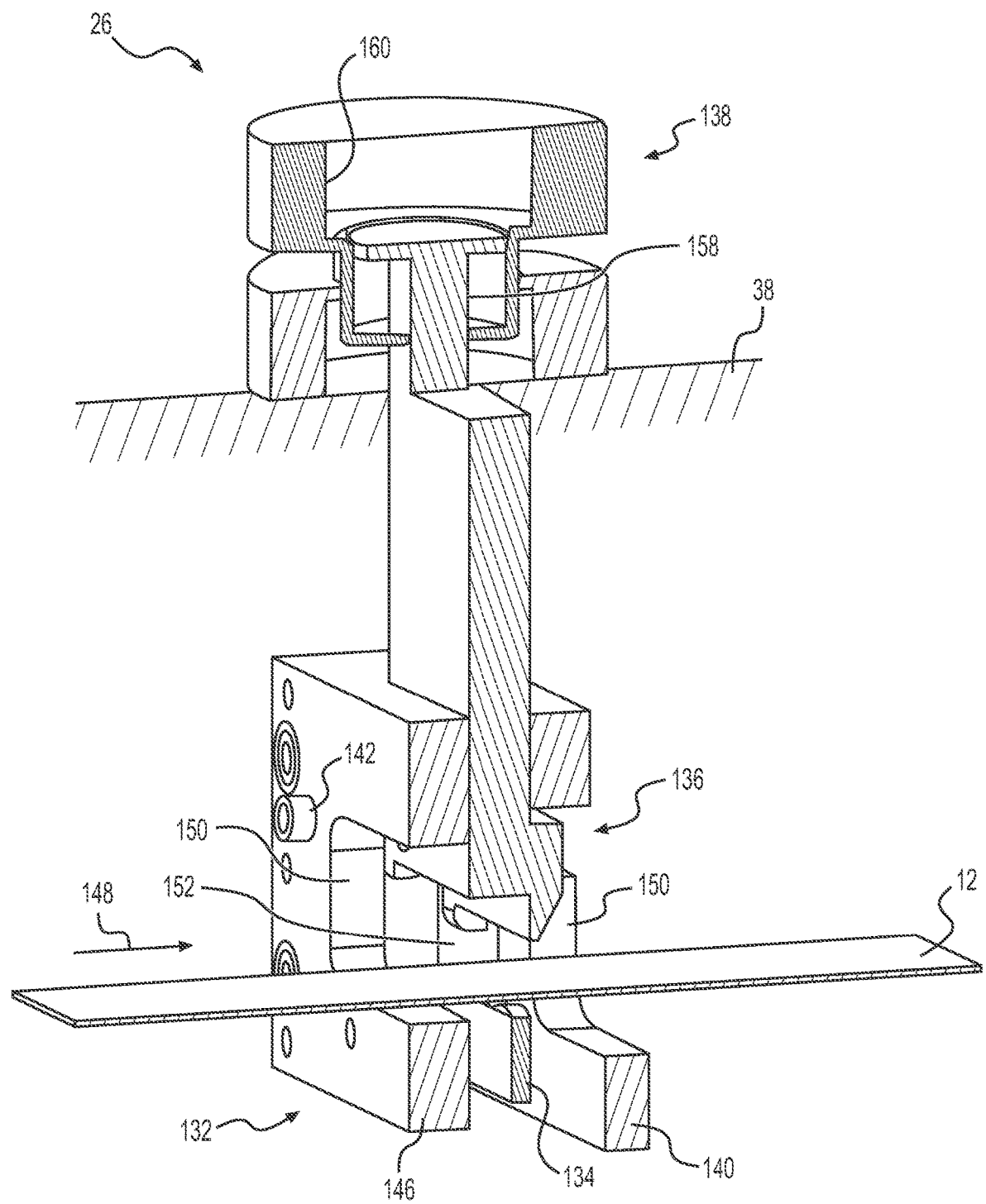

Cutting module 26 may be located between feeding module 24 and compacting module 28 (referring to FIGS. 2 and 3), and configured to selectively sever the reinforcements passing therethrough. As can be seen in FIGS. 8 and 9, cutting module 26 may include, among other things, a frame 132, a blade 134 secured within frame 132, an anvil 136 movable relative to frame 132, and an actuator 138 configured to move anvil 136. Frame 132 may include a leading component 140 that is removably connected (e.g., via fasteners 142) to a trailing component 146 (i.e., relative to a travel direction of the reinforcements through head 16, represented by an arrow 148). Leading and trailing components 140, 146 may be generally rectangular plates having aligned central openings 150 through which the reinforcements travel. A trailing primary surface of leading component 140 may be configured to mate against a leading primary surface of trailing component 144, and one or more channels 152 may be formed at the interface (e.g., at opposing edges of central opening 150). Channel(s) 152 may function as guides in which anvil 136 slides towards and away from the reinforcements and blade 134. In the disclosed embodiment, channels 152 are stepped to accommodate corresponding steps formed within opposing edges of anvil 136 (described in more detail below). It is contemplated, however, that channels 152 may be devoid of steps, if desired. Frame 132 may be connected to housing 20 (referring to FIG. 1) via one or more fasteners 154.

Blade 134 may be rigidly connected to frame 132 (e.g., sandwiched between leading and trailing components 140, 144), and oriented transversely to the travel direction of the reinforcements. A cutting edge 156 of blade 134 may include sharpened serrations that function to grasp and cut individual or groups of individual reinforcements. In one embodiment, the reinforcements have a diameter in the range of 1.82E-4 in to 1.48E-3 in, and the serrations (e.g., an inter-peak or inter-valley distance of the serrations) of cutting edge 156 may be sized and separated by a distance that ensures proper cutting without significant reinforcement movement. For example, a diameter of a single reinforcement or group of reinforcements (e.g., tow) may be wider (e.g. by about 0.005-0.020") than a whole-number-multiple of the diameter of a serration of blade 134.

Anvil 136 may be pushed and/or pulled by actuator 138 in a direction substantially orthogonal to the travel direction of the reinforcements, such that the reinforcements are urged radially against the serrations of blade 134. In the disclosed embodiment, anvil 136 is generally rectangular and plate-like, having a tip end oriented toward blade 134 and an opposing base end oriented toward actuator 138. In the disclosed embodiment, the tip end of anvil 136 is offset in the travel direction of the reinforcements (e.g., relative to a body or shaft portion) by an amount about equal to a thickness of anvil 136. In addition, the tip end may be chamfered away from blade 134 to inhibit binding of the tip end with the reinforcements. The chamfer may have an angle of about 5-90° and a length of about 1-1.5 inches. Although the disclosed example illustrates anvil 136 as being a single-piece unit, it is contemplated that anvil 136 could alternatively be a multi-piece assembly, if desired. For example, the tip end of anvil 136 could be separate from the rest of anvil 136. The tip of anvil 136 may be made from a hardened tool steel, a silicon carbide, or another ceramic. In some instances, lubrication may be selectively applied to anvil 136, if desired. For example, a Teflon-based grease or another type of lubrication may be manually and/or automatically (e.g., via a pressure or drip system—not shown) disposed within channels 152.

Actuator 138 is illustrated in FIGS. 8 and 9 as being a pneumatic linear actuator, having a piston 158 connected (e.g., in any rigid, flexible, and/or pivotal manner known in the art) to a base end of anvil 136. As air (or another pressurized medium) is applied to corresponding chamber(s) within a cylinder 160, piston 158 may be caused to move linearly in and/or out of cylinder 160. It is contemplated that actuator 138 may be a single-acting device having a return mechanism (e.g., a spring), or a double-acting device, as desired. A stroke-length, speed, and/or force of actuator 138 may be adjustable (e.g., by adjusting a medium flow rate, a medium pressure, an end-stop location, etc.). It is contemplated that another type of mechanism (e.g., a hydraulic piston, a solenoid-driven plunger, a motor/lead-screw combination, motor/cam, etc.) may alternatively be used as actuator 138, in some embodiments. Cylinder 160 may be rigidly connected to housing 20 (e.g., to trail panel 38) via any number of threaded fasteners (not shown). In one embodiment, cylinder 160 is a pneumatic cylinder having an internal bore of about 0.10-1.0 inches.

Figure 10:
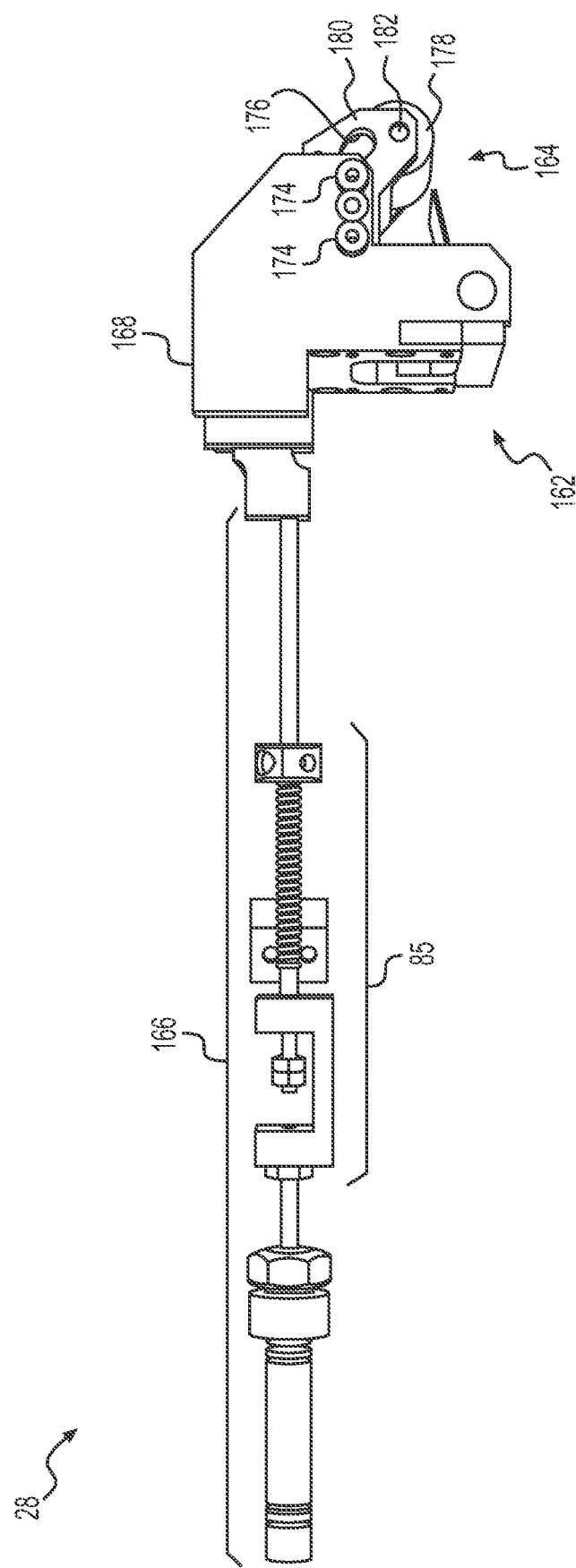
FIGS. 10, 11, and 12 are diagrammatic illustrations of an exemplary compacting module that may form a portion of the print head of FIGS. 2 and 3.
Figure 11:
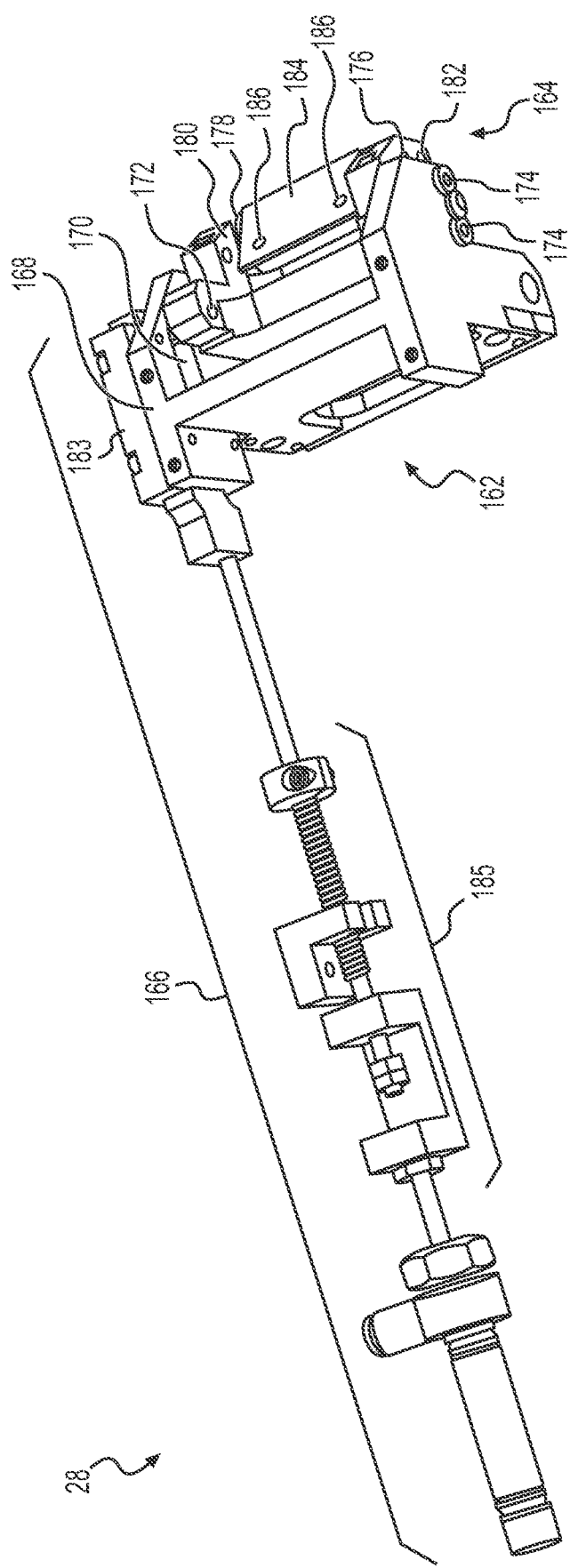
Figure 12:
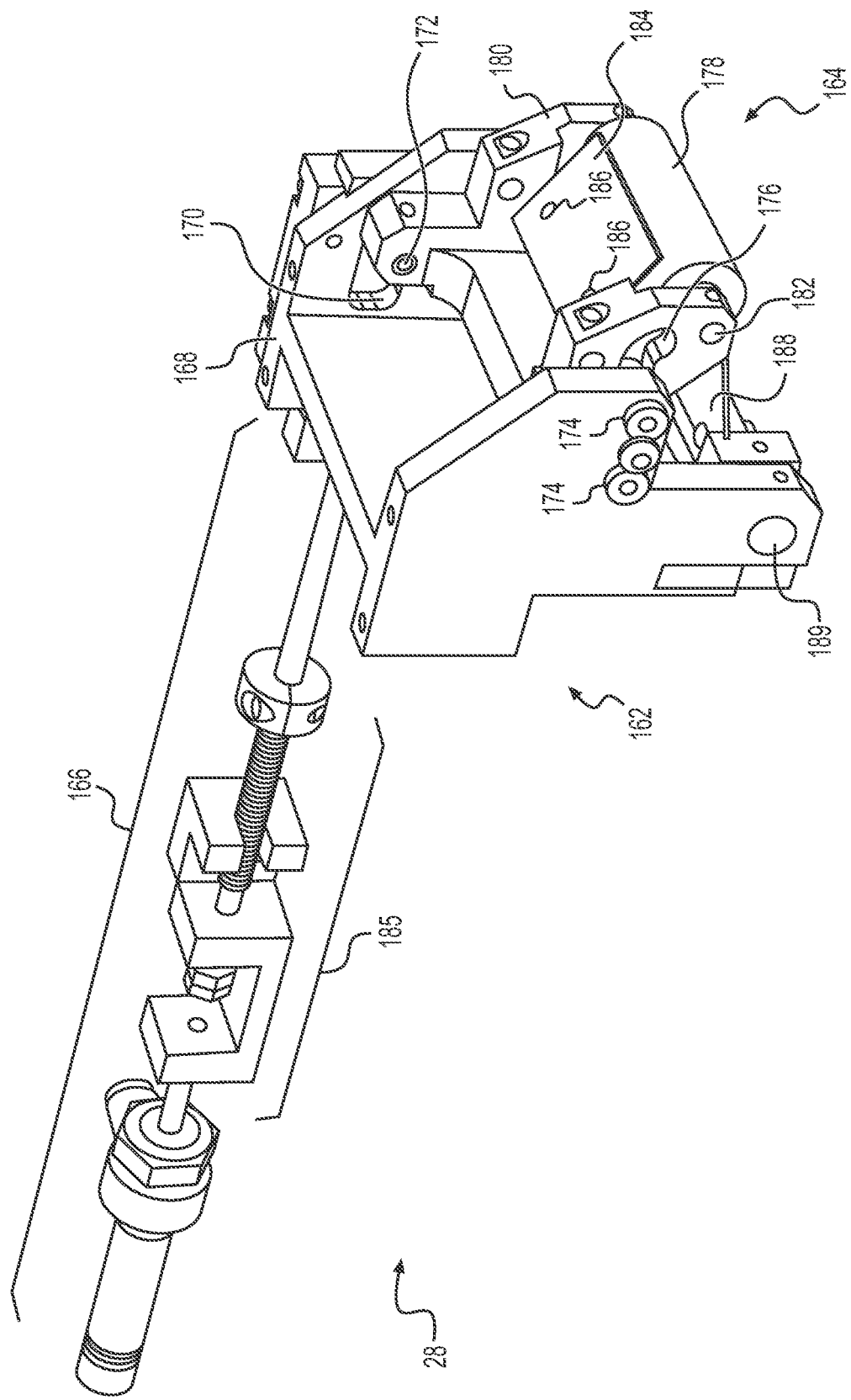
Figure 13:
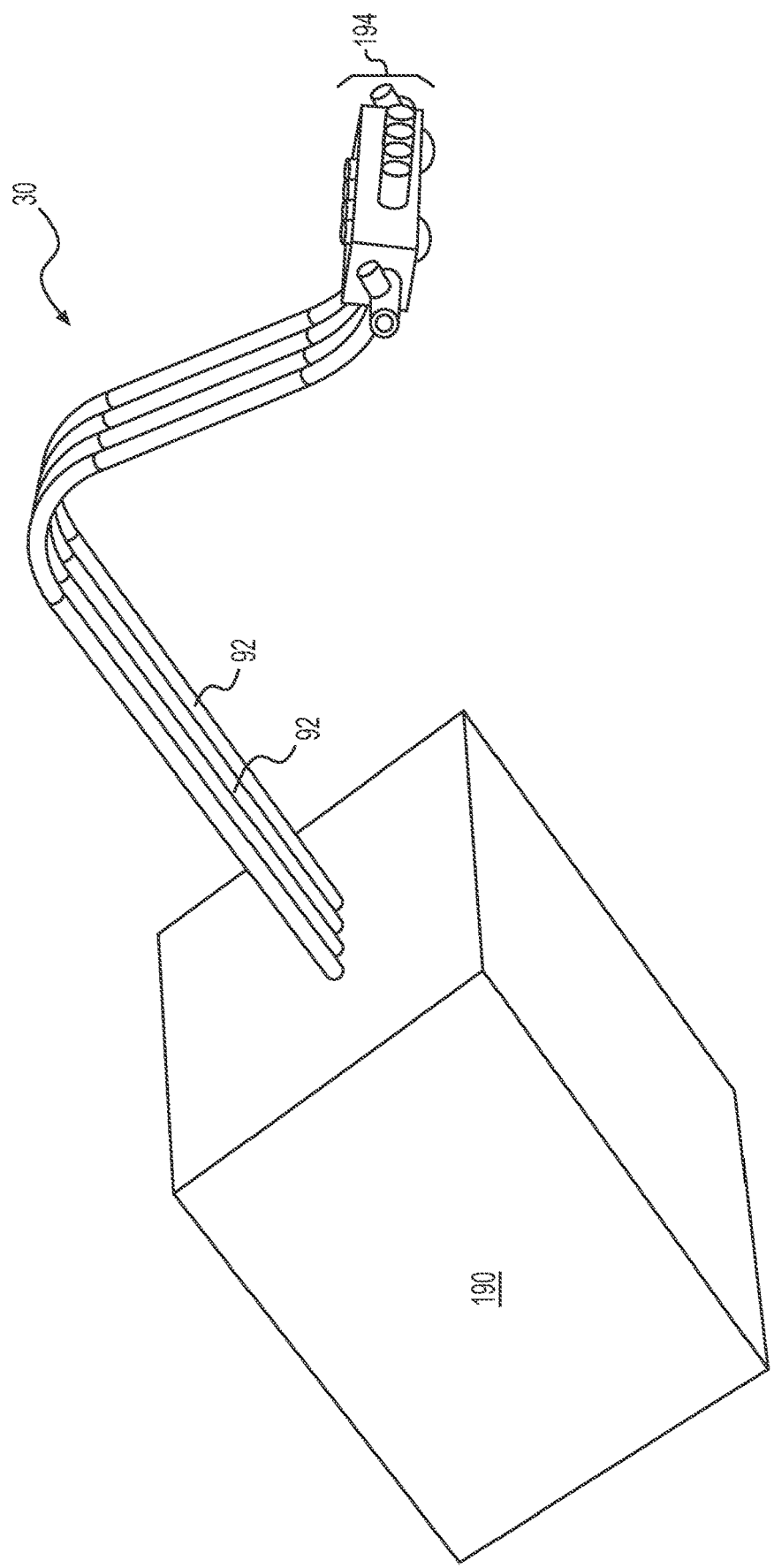
FIG. 13 is a diagrammatic illustration of an exemplary curing module that may form a portion of the print head of FIGS. 2 and 3.

FIGS. 10, 11, and 12 illustrate various views of an exemplary compacting module 28. As shown in these figures, compacting module 28 may be a self-contained assembly of multiple components that interact to selectively compact the wetted-reinforcements during discharge from head 16. These components may include, among other things, a frame 162, a compactor 164 operatively mounted at least partially within frame 162, and an actuator 166 configured to selectively move compactor 164 between varying levels of compaction. Frame 162 may be a monolithic structure having an end surface 168 that is removably connected to housing 20 (e.g., to trail panel 38—referring to FIGS. 2 and 3). A cross-section of frame 162 may have an I-shape, when viewed from the perspective of end surface 168. Opposing end-flanges of the I-shape may extend in the travel direction of the reinforcements through head 16. At least one of the end-flanges may have a groove 170 formed at an inside surface that is configured to receive a sliding pin 172 of compactor 164 (e.g., at only one end of compactor 164) and guide, as well as limit, the motion of compactor 164 imparted by actuator 166. Similarly, one or more sliding pins 174 may extend inward from one or both of the end-flanges to engage groove(s) 176 of compactor 164 to guide and/or limit motion of compactor 164 (e.g. from opposing ends) relative to frame 162.

Compactor 164 may be disposed between the end-flanges of frame 162, and extend from the discharge end of housing 20 (referring to FIGS. 2 and 3). In other words, compactor 164 may form a tip and tool center point (TCP) of head 16. In the disclosed embodiments, head 16 is nozzle-less. Accordingly, the discharge location of head 16 may correspond with a line of contact between compactor 164 and a print surface (e.g., where compactor 164 pushes the wetted-reinforcements onto the surface). It should be noted that the line of contact may shift, for example as head 16 is tilted by support 14 (referring to FIG. 1) relative to the print surface and/or relative to a travel direction (e.g., if printing into free-space).

Because compactor 164 may form the tip and TCP of head 16, a form factor of head 16 may be at least partially defined by a spatial relationship between compactor 164 and the surrounding components (e.g., housing 20) that extend outward from a center line (e.g., from the reinforcement travel path) of head 16. This form factor may be represented by an angle $\alpha$ (shown only in FIG. 3). Angle $\alpha$ may represent the angle of a smallest internal corner between adjacent surfaces in which head 16 may be fully functional. In the disclosed embodiments, $\alpha$ may be less than about 90° (e.g., about 80-90°).

Compactor 164 may include a roller 178 that is held within a bracket 180 (e.g., via an axle 182 and any number of bearings, bushings, clips, set screws, etc.—not shown). Roller 178, like entrant roller(s) 52, may be fabricated from a relatively compliant and/or low-friction type of material. For example, roller 178 may be fabricated from aluminum, steel, Delrin, Teflon, nylon, or another similar material known in the art. Roller 178 may have a diameter of about 0.25-5.0", and an outer annular surface that is smooth, porous, or roughened (e.g., knurled) to reduce drag, to provide a desired surface texture, to reduce fiber wear or breakage, to retain and/or dispense additional matrix, etc. It is contemplated that, in some instances, a scraper (not shown) could be associated with roller 178, if desired, to remove excess resin. In some applications, a location of roller 178 may be adjustable. Pin 172 may extend outward from a first side of bracket 180 to engage groove 170 of frame 162, while grooves 176 may be formed within the first side of bracket 180 and in a second side at an opposing end of roller 178. During operation of actuator 166, roller 178 may be caused to move together with bracket 180 relative to frame 162.

The movement of compactor 164 initiated by actuator 166 may include sequential linear and rotational motions. The linear motion may affect a pressure applied by roller 178 on the discharging material, while the rotational motion may affect engagement of roller 178 with the material. For example, when actuator 166 is in a most-retracted state, roller 178 may be pulled a greatest linear distance into housing 20 and also rotated away from the discharging reinforcements. This retracted state may provide a greatest clearance for purposes of threading the reinforcements through head 16. As actuator 166 is extended, roller 178 may first be rotated from the retracted state to an engaged state against the discharging reinforcements. Further extension of actuator 166 may then affect a pressure applied by roller 178 on the reinforcements, with a greater extension corresponding with a greater pressure, and vice versa.

In one embodiment, roller 178 may have a rotation range/clearance, and a translation range. These ranges may be affected by the geometry of grooves 170 and 176. For example, a length of groove 170 may correspond with the translation range, while an arc length and/or curvature radius of grooves 176 may correspond with the rotational range and/or clearance.

Actuator 166 may be a linear-movement device that is mounted inside housing 20 and configured to selectively extend and retract to move compactor 164 between its engaged position and the threading or disengaged position. In the disclosed embodiment, actuator 166 is a two-position pneumatic cylinder. It is contemplated, however, that actuator 166 could alternatively be a solenoid plunger, an electric motor/leadscrew mechanism, or another device having any number of different positions. Actuator 166 may include a cylinder, and a piston having a rod extending therefrom. The rod of the piston may extend from housing 20 toward compactor 164, and pivotally connect to bracket 180 (e.g., via pin 172). The rod of the piston may also be slidingly supported by frame 162 via a slide cover 183 that is affixed (e.g., via threaded fastening) to an outer end surface of frame 162. As pressurized air (or another medium) is introduced into a first chamber of the cylinder, the piston may extend from the cylinder, causing the rod to slide away from the cylinder through cover 183 and push bracket 180 to the engaged state. In contrast, as pressurized air is introduced into a second chamber of the cylinder the piston may be retracted into the cylinder, causing the rod to slide back toward the cylinder and retract bracket 180 to the disengaged or threading position.

In one embodiment, a spring-biased lash adjuster 185 forms a link within the piston rod. This may allow the pivoting motion of bracket 180 and/or the pressure exerted by compactor 164 on discharging material to be adjusted. It is contemplated that lash adjuster 185 may be a manual adjustment device or an automated adjustment device, as desired.

In one embodiment, a scraper 184 may be associated with compactor 164, and function to remove residual matrix (cured and/or uncured) from the surface of roller 178. In the disclosed example of FIGS. 10-12, scraper 184 is mounted to bracket 180 at a trailing side of roller 178 (e.g., opposite the discharging reinforcements) and extends to or nearly to the surface of roller 178. Scraper 184 may be removably connected to bracket 180 (e.g., via one or more fasteners 186), such that scraper 184 may easily be adjusted, cleaned, repaired and/or replaced.

Also in some embodiments, a tag-end support or final guide 188 may be provided adjacent roller 178 that is configured to support and guide the tag-end of a reinforcement after the reinforcement has been severed by cutting module 26. In particular, it may be possible under some circumstances (e.g., when head 16 is tilted in a leading direction) for the tag-end to flop down onto the print surface after being severed, before roller 178 has an opportunity to roll over and compress the material. In these circumstances, instead of the tag-end flopping onto the print surface, the tag-end may flop into support 188 and/or be held against (e.g., wrapped around) roller 178. This may allow the tag-end to subsequently be pulled down and compressed onto the print surface, without discontinuity in print quality. In the disclosed embodiment, tag-end support 188 is a flat or curved plate mounted to frame 162 (e.g., via a pin 189) that extends back toward roller 178. It is contemplated, however, that tag-end support 188 could alternatively embody a rod, a lever, or an arm and/or extend forward from roller 178 or bracket 180. It is also contemplated that tag-end support 188 may also be movable between an extended position (shown in FIG. 12) and a stowed position, as desired. For example, movement of compactor 164 to the retracted or threading position may also function to move tag-end support 188 to the stowed position, thereby providing increased clearance for threading purposes.

Curing module 30 may include any combination of components situated at any convenient location to cure the matrix coating the reinforcements, after compacting module 28 has compacted the discharging material. In the disclosed embodiment, curing module 30 includes a source 190 of cure energy, and one or more transmission lines 192 extending from source 190 to a point of exposure 194 adjacent roller 178. In the disclosed embodiment, the cure energy is UV light and/or laser energy. In one example, the energy is generated by one or more LEDs and/or lasers associated with source 190, and transmission lines 192 are fiber optics that transmit the energy to the point of exposure 194. One or more brackets 196 may be mounted at the point of exposure 194 (e.g., connected to frame 162 and/or bracket 180), and used to secure and/or aim the distal ends of the fiber optics. It is contemplated that different or additional sources 190 may be utilized in place of UV-generating LEDs or lasers, if desired. For examples, sources of microwave energy, heat energy, vibrational energy, chemical energy, etc. could be used. It is also contemplated that transmission lines 192 may be omitted in some embodiments.

INDUSTRIAL APPLICABILITY

The disclosed system and print head may be used to continuously manufacture composite structures having any desired cross-sectional size, shape, length, density, and/or strength. The composite structures may include any number of different reinforcements of the same or different types, diameters, shapes, configurations, and consists, each coated with a common matrix. Operation of system 10 will now be described in detail with reference to FIGS. 1-3.

At a start of a manufacturing event, information regarding a desired structure 12 may be loaded into system 10 (e.g., into controller 21 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively supplied to head 16 (e.g., from an onboard source or from a remote or offboard source—not shown). The reinforcements may then be threaded through head 16 prior to start of the manufacturing event.

Threading of head 16 may include passing (e.g., by way of open door 42) of the reinforcements from the top of the image shown in FIG. 3 and through guiding module 22 (e.g., between entrant rollers 52) downward. At this point in time, piloting subassembly 54 may also be open (e.g., cover 74 and latching mechanism 76 may be removed), such that the reinforcements may be placed at desired locations relative to features 82 (e.g., between particular dividers and/or within specific grooves—referring to FIG. 5). Cover 74 and latching mechanism 76 may thereafter be re-secured in place over channeling base 72.

Additional lengths of reinforcements may then be pulled through guiding module 22 and led into feeding module 24. Specifically, the reinforcements may be pulled through the space between feed rollers 98, which may be in their disengaged orientations at this point in time. The reinforcements may then be pulled further (e.g., from the tip of head 16), until they reach compactor roller 178. Compactor roller 178 may be in its disengaged state at this time, such that greater clearance is provided for threading. After threading is complete, compactor roller 178 may be pushed forward to its engaged state, and head 16 may be ready to discharge matrix-coated reinforcements. Tag-end support 188 may hold the free end of the reinforcements against roller 178 at this point in time.

Head 16 may then be moved by support 14 under the regulation of controller 21 to cause matrix-wetted reinforcements to be placed against or on a corresponding anchor point 18 (referring to FIG. 1). Curing module 30 may then be selectively activated to cause hardening of the matrix surrounding the reinforcements, thereby bonding the reinforcements to anchor point 18. Thereafter, head 16 may be moved in any trajectory to pull wetted-reinforcements from head 16 onto existing surfaces and/or into free space to form structure 12.

The component information may be used to control operation of system 10. For example, the reinforcements may be discharged from head 16 (along with the matrix), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass under compactor 164 and thereafter be exposed to cure energy from curing module 30.

After a period of material discharging, it may be come necessary to sever the reinforcements (e.g., to complete the manufacturing event and/or to move head 16 to another area of structure 12 for restart of a new track of discharging material). At this point in time, actuator 138 may be selectively energized (e.g., by controller 21—referring to FIG. 1) to push anvil 136 downward (referring to the perspective of FIGS. 8 and 9) past the serrated cutting edge 156 of blade 134, thereby severing the reinforcements. This may leave a tag-end of free material within head 16 that is yet to be discharged and placed. The tag-end may rest on and/or in support 188 (referring to FIG. 12), until additional movement of head 16 causes the material to be pulled out of head 16 and compacted by compactor 164.

It has been found that, in some applications, clamping of the reinforcements prior to severing may be beneficial. For example, clamping may inhibit tension within the reinforcement from causing movement after severing is complete. Accordingly, any type of clamping mechanism known in the art (not shown) could be located upstream and/or downstream of blade 134 and anvil 136.

To thereafter restart discharging of a new track of material, support 14 (under the regulation of controller 21) may move head 16 to the new-start area. Compacting module 28 may be moved to its retracted state, and feeding module 24 may selectively cause feed rollers 98 to rotate to their engaged positions and push the new end of matrix-wetted reinforcements toward compactor 164. This may be considered part of a startup sequence that is implemented after every cut of the reinforcements and/or at the beginning of any print process. It should be noted that head 16 may be maintained in a vertical orientation during the startup sequence, in some embodiments, such that the material being pushed out by feed rollers 98 hangs in general alignment with the normal travel path of wetted-reinforcements through head 16. This may help to avoid hang-ups inside of head 16. In general, feeding module 24 may be used primarily (e.g., only, in some embodiments) during the startup sequence. Other orientations of head 16 during the startup sequence may also be possible and beneficial.

It will be apparent to those skilled in the art that various modifications and variations can be made to the disclosed system and head. Other embodiments will be apparent to those skilled in the art from consideration of the specification and practice of the disclosed system and head. It is intended that the specification and examples be considered as exemplary only, with a true scope being indicated by the following claims and their equivalents.

What is claimed is:

1. A print head for an additive manufacturing system, comprising:
   a receiving end configured to separately receive a matrix and a continuous reinforcement;
   a discharging end configured to discharge the continuous reinforcement at least partially coated in the matrix;
   a module located between the receiving end and the discharging end and configured to disburse the matrix through the continuous reinforcement;
   a compactor located at the discharging end and forming a tool center point for the print head;
   a source of cure energy mounted remote from the discharge end; and
   a transmission line extending from the source to the compactor.

2. The print head of claim 1, wherein the continuous reinforcement contacts the compactor before contacting a surface onto which the continuous reinforcement is to be discharged.

3. The print head of claim 1, wherein the continuous reinforcement is first coated with the matrix at a location inside of the module.

4. The print head of claim 3, wherein the includes at least one channel to receive the continuous reinforcement, the at least one channel having a width that is greater than a thickness.

5. The print head of claim 3, wherein the module includes at least one contact surface that generates a pressure differential within the continuous reinforcement.

6. The print head of claim 4, wherein the at least one channel tapers along its length.

7. The print head of claim 4, wherein the at least one channel has a cross-sectional area 40% greater than an area of the continuous reinforcement passing through the at least one channel.

8. The print head of claim 4, wherein the module includes:
   at least one entrant roller; and
   a piloting subassembly located downstream of the at least one entrant roller.

9. The print head of claim 1, further including a final guide associated with the compactor.

10. The print head of claim 9, wherein the final guide is configured to bias the continuous reinforcement toward the compactor.

11. The print head of claim 1, wherein the compactor is moveable relative to the discharging end from a threading position away from the continuous reinforcement to a compacting position against the continuous reinforcement.

12. The print head of claim 11, wherein the compactor is further moveable at the compacting position to adjust a pressure exerted by the compactor on the continuous reinforcement.

13. The print head of claim 11, further including an actuator configured to adjust positions of the compactor.

14. The print head of claim 13, further including a lash adjuster located between the actuator and the compactor.

15. The print head of claim 1, wherein the transmission line is configured to direct cure energy to a trailing side of the compactor.

16. A print head for an additive manufacturing system, comprising:
- a receiving end configured to separately receive a matrix and a plurality of continuous reinforcements;
- a discharging end configured to discharge a ribbon made from the plurality of continuous reinforcement and the matrix;
- a module located between the receiving end and the discharging end and configured to disburse the matrix through the plurality of continuous reinforcements;
- a compactor located at the discharging end and forming a tool center point for the print head; and
- a cure module configured to direct cure energy to the ribbon.

17. The print head of claim 16, wherein the cure module includes:
- a source of cure energy; and
- a transmission line extending from the source to the compactor.

18. The print head of claim 16, wherein the module includes a plurality of channels, each configured to receive one of the plurality of continuous reinforcements.

19. The print head of claim 18, wherein the plurality of channels converge toa wards each other at an exit end.

20. The print head of claim 18, wherein each of the plurality of channels has a width that is greater than a thickness.

* * * * *